UNITED STATES PATENT OFFICE.

JEAN ALTWEGG AND JOANNY LANDRIVON, OF LYON, FRANCE, ASSIGNORS TO SOCIETE CHIMIQUE DES USINES DU RHONE (ANCIENNEMENT GILLIARD, P. MONNET ET CARTIER), OF PARIS, FRANCE.

PROCESS FOR THE MANUFACTURE OF ETHEREAL SALTS OF ETHYLENIC HALOGEN-HYDRINS.

1,393,191. Specification of Letters Patent. Patented Oct. 11, 1921.

No Drawing. Application filed June 13, 1919. Serial No. 303,976.

*To all whom it may concern:*

Be it known that we, JEAN ALTWEGG, a citizen of the Confederation of Switzerland, and JOANNY LANDRIVON, a citizen of the Republic of France, both residents of Lyon, France, have invented a certain new and useful Process for the Manufacture of Ethereal Salts of Ethylenic Halogenhydrins, of which the following is a specification.

This invention has for its object a new method of obtaining the ethereal salts of the ethylenic halogenhydrins having for formula $$RCOOCH_2CH_2X$$

where R represents an organic radical and X a halogen.

According to this invention, ethylene oxid is caused to react on acidyl chlorids or bromids according to the equation, $$RCOX + CH_2CH_2O = RCOOCH_2CH_2X$$

by heating a mixture of the two substances, in equal molecular proportions, in a closed vessel, at a temperature depending on the nature of the organic radical R. One can also proceed more simply in an open vessel by passing gaseous ethylene oxid through the acidyl halid raised to a suitable temperature. This new reaction, which is a simple addition reaction is extremely regular and gives quantitative yields.

*Example 1—Manufacture of β-chlorethyl acetate.*—Gaseous ethylene oxid is passed into boiling acetyl chlorid, in equal molecular proportions, and is immediately and substantially absorbed. The result of the reaction is β-chlorethyl acetate, with a boiling point of 143° to 144° C.

*Example 2—Manufacture of β-chlorethyl chloracetate.*—Gaseous ethylene oxid is passed through chloracetyl-chlorid at 100° C. in equal molecular proportions. The reaction is vigorous and causes ebullition of the liquid. After cooling, the product is purified, by fractional distillation under a pressure of 12 mm. of mercury. The product distils entirely between 94° and 95° C. and gives all the characteristic reactions of β-chlorethyl-chloracetate.

*Example 3—Manufacture of β-bromethyl acetate.*—A mixture of ethylene oxid and of acetyl bromid in equal molecular proportions is kept for several hours at normal temperature. On distillation, a very good yield of β-bromethyl-acetate is obtained with a boiling point of 163° C.

*Example 4—Manufacture of β-chlorethyl benzoate.*—Benzoyl chlorid is heated to a temperature of 190° C. and gaseous ethylene oxid is passed slowly through the hot liquid and is absorbed, the temperature being meanwhile raised. When an equal molecular proportion of ethylene oxid has been absorbed, the mixture is allowed to cool and is purified by fractional distillation under a pressure of 5 mm. of mercury. The preparation distils between 120° and 122° C. and is β-chlorethyl-benzoate.

*Example 5—Manufacture of β-chlorethyl p-nitro-benzoate.*—By replacing in the previous example benzoyl chlorid by p-nitrobenzoyl chlorid, β-chlorethyl-p-nitro-benzoate is obtained. On recrystallization from dilute alcohol it is obtained in the form of pale yellow crystals with melting point of 56° C.

The process herein described results in a series of products which are of great importance in the synthesis of compounds having most valuable therapeutic properties.

It is understood that the above examples are given by way of illustrative example only, and may be varied in details according to the particular reagents employed.

What we claim and desire to secure by Letters Patent is:—

1. A process for the manufacture of ethereal salts of ethylenic-halogenhydrins, consisting in passing gaseous ethylene oxid through a heated acidyl halid.

2. A process for the manufacture of β-chlorethyl - p - nitrobenzoate, consisting in passing gaseous ethylene oxid through heated p-nitro benzoyl chlorid, substantially as set forth.

In witness whereof we have hereunto signed our names in the presence of two subscribing witnesses.

JEAN ALTWEGG.
J. LANDRIVON.

Witnesses:
MARIN GACHON,
LOUIS ERCHER.